No. 874,867. PATENTED DEC. 24, 1907.

H. RICHELDERFER.

WEEDER AND STALK CUTTER.

APPLICATION FILED JUNE 19, 1907.

WITNESSES

INVENTOR
Henry Richelderfer
BY
ATTORNEYS

UNITED STATES PATENT OFFICE.

HENRY RICHELDERFER, OF WASCO, OREGON.

WEEDER AND STALK-CUTTER.

No. 874,867.  Specification of Letters Patent.  Patented Dec. 24, 1907.

Application filed June 19, 1907. Serial No. 379,733.

*To all whom it may concern:*

Be it known that I, HENRY RICHELDERFER, a citizen of the United States, and a resident of Wasco, in the county of Sherman and State of Oregon, have invented a new and Improved Weeder and Stalk-Cutter, of which the following is a full, clear, and exact description.

This invention relates to weeders, and more particularly to that class of weeders adapted to be used as stalk cutters.

The object of the invention is to provide a simple, strong and efficient weeder and stalk cutter presenting blades of suitable form for cutting the stalks of weeds and the like.

A further object of the invention is to provide a device of the class described having a truck, independent members mounted behind said truck, and provided with drums presenting helical blades for cutting the stalks of weeds and the like.

A still further object of the invention is to provide a weeder and stalk cutter having means for rapidly severing the stalks of weeds and the like, while at the same time suitably working the surface of the soil for certain agricultural purposes.

The invention consists in the construction and combination of parts to be more particularly described hereinafter and fully set forth in the claims.

Figure 1:
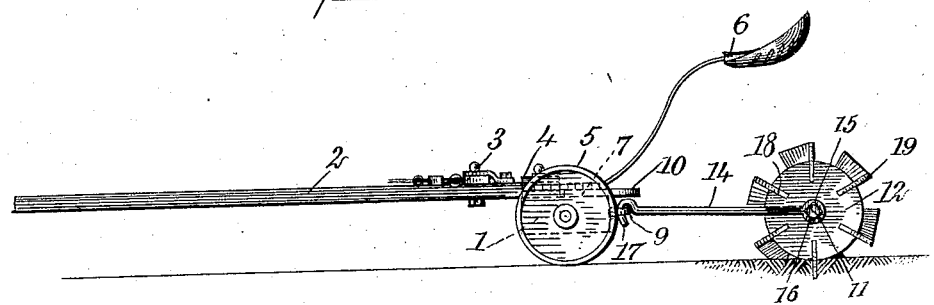
Figure 2:
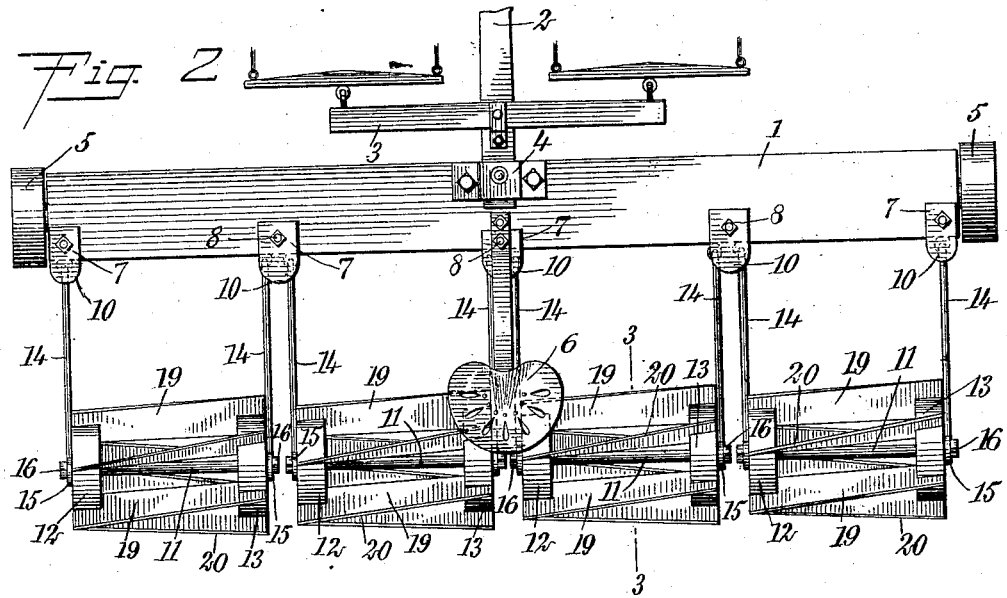
Figure 3:
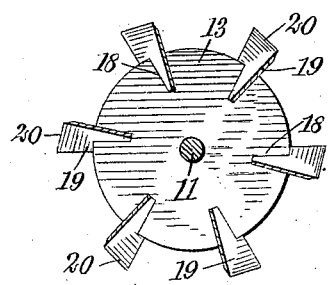

Reference is to be had to the accompanying drawings, forming a part of this specification, in which similar characters of reference indicate corresponding parts in all the views, and in which Figure 1 is a side elevation of my invention; Fig. 2 is an enlarged plan view; and Fig. 3 is a cross-section on the line 3—3 of Fig. 2.

Before proceeding to a more detailed explanation of my invention, it should be clearly understood that it is intended for use, primarily, as a weeder, being adapted to be drawn by horses or other suitable means over the surface of the ground, and having drums arranged to travel upon the ground and presenting cutting blades to sever the stalks of the weeds. The cutting blades are of a form which I have found peculiarly useful for this purpose. They project beyond the peripheries of the drums, and owing to the weight are forced a suitable distance into the ground, whereby the weeds are severed below the surface. The arrangement is such that the drums and blades as they travel upon the ground work up the latter to form what may be termed a "dust mulch". A plurality of cutting attachments, preferably four, are carried by each stalk cutter. Each cutting attachment comprises two drums of different diameters and rigidly mounted upon a rotatable shaft. As the drums are rigid with respect to one another and are of different diameters, a sliding or scraping action partly results when the cutting attachments travel upon the ground; this action assists in the thorough working of the surface soil.

Referring more particularly to the drawings, 1 represents a truck member or beam, to which is secured near the center a tongue 2 having a draft mechanism 3 by means of which the draft animals are attached to the device. The tongue 2 is secured to the truck by means of a suitable bracket 4. At each end the truck beam is mounted upon wheels or rollers 5 which are arranged to travel upon the surface of the ground. A suitable seat 6 for the operator is mounted upon the truck, preferably near the center to insure the equal distribution of the weight. At the rear edge, the truck beam 1 has a plurality of projecting brackets 7 securely mounted upon the beam by means of bolts 8. The brackets 7 have integral eyes 9 and thereabove flanges 10 for a purpose which will appear hereinafter.

The cutting attachments, which are preferably four in number, comprise a suitable shaft 11 having near the ends rigid drums 12 and 13; the drums 12 are smaller in diameter than the drums 13. Arms 14 having eyes 15 are pivoted at the ends of the shafts by means of the eyes 15 and are held in position by suitable nuts 16. At the opposite ends, the arms 14 have hooks 17 which engage the eyes 9 of the brackets 7, to secure the cutting attachments to the truck. The flanges 10 serve to prevent the accidental displacement of the hooks 17 from the eyes 9. The arms 14 serve as links, by means of which the cutting attachments are trailed to the trucks, the eyes 15 of the arms acting as bearings for the shafts 11.

The drums 12 and 13 have radial recesses or slots 18. The arrangement is such that the slots of one of the drums are arranged intermediate of the slots of the other of the drums. Cutting blades 19 are located in the slots of the drums 12 and 13, extending from one to the other of the spaced drums. The cutting blades 19 project beyond the peripheries of the drums and have outer cutting edges 20. As the radial recesses are in different planes and at an angle with each other, each blade assumes the form of a helix or a helical convolute. In addition to the partial sliding or scraping action resulting from the rolling movement of the cutting attachment upon the ground, the helical form of the blades further effects a thorough working of the surface soil. By having a plurality of trailing cutting attachments hinged to the truck, the flexibility of the implement is increased and the device is little affected by irregularities in the surface of the ground.

It will be understood that my invention can be fashioned from various suitable materials. I prefer to use cast iron for certain of the parts, such as the brackets and drums, while the blades should be of steel. The drums, if so desired, may be of different sizes, for it will be understood that it may be of advantage to provide the cutting attachments with the corresponding drums of different diameters, and if required the dimensions of the parts can be altered to suit conditions and circumstances. The seat for the operator can also be mounted upon the cutting attachments whereby the weight of the latter is increased and consequently the same work up the soil more thoroughly.

Having thus described my invention, I claim as new and desire to secure by Letters Patent:—

1. In a device of the class described, drums of different sizes arranged to travel upon the ground and having a common projecting cutting blade arranged at an angle with the longitudinal axes of said drums and carried at the peripheries of said drums.

2. In a device of the class described, drums of different diameters rigidly connected and arranged to travel upon the ground, said drums having a common projecting cutting blade of helical form carried at the peripheries of said drums.

3. In a device of the class described, a shaft having drums of different sizes arranged to travel upon the ground, and cutting blades projecting beyond the peripheries of said drums, said blades being disposed at an angle to said shaft.

4. In a device of the class described, a shaft having drums of different diameters arranged to travel upon the ground, and cutting blades projecting beyond the peripheries of said drums and connecting the same, said blades being of helical form.

5. In a device of the class described, a shaft, spaced drums rigid with said shaft and arranged to travel upon the ground, said drums being of different diameters and having radial recesses, said recesses of one of said drums being arranged intermediate of the recesses of the other of said drums, and cutting blades arranged in said recesses, said blades projecting beyond the peripheries of said drums.

6. In a device of the class described, a shaft, spaced drums rigid with said shaft and arranged to travel upon the ground, said drums being of different diameters and having radial recesses, said recesses of one of said drums being arranged in advance of the recesses of the other of said drums, and cutting blades extending from one to the other of said drums and arranged in said recesses, said blades projecting beyond the peripheries of said drums and being helical in form.

7. In a device of the class described, a truck, a plurality of shafts, each of said shafts having drums of different diameters arranged to travel upon the ground, pivoted arms connecting said shafts and said truck, and cutting blades mounted upon said drums and projecting beyond the peripheries thereof, said blades being helical in form.

8. In a device of the class described, a plurality of shafts, spaced drums rigid with each of said shafts and arragned to travel upon the ground, arms mounted upon said shafts and pivotally secured to said truck, said drums of each of said shafts being of different diameters and having radial recesses, said recesses of one of said drums of each shaft being arranged in advance of the recess of the other of said drums of the same shaft, and cutting blades arranged in said recesses and projecting beyond the peripheries of said drums, said blades being helical in form.

In testimony whereof I have signed my name to this specification in the presence of two subscribing witnesses.

HENRY RICHELDERFER.

Witnesses:
  C. J. BRIGHT,
  C. A. AKERS.